(12) United States Patent
Hofheins et al.

(10) Patent No.: US 6,672,601 B1
(45) Date of Patent: Jan. 6, 2004

(54) MEAL DELIVERY CART

(75) Inventors: Leonard L. Hofheins, Walnut Creek, CA (US); Del M. Thornock, Concord, CA (US); Lou Shikany, Alameda, CA (US)

(73) Assignee: The County of Alameda, a Political Subdivision of the State of California, Oakland, CA (US)

( * ) Notice: Subject to any disclaimer, the term of this patent is extended or adjusted under 35 U.S.C. 154(b) by 0 days.

(21) Appl. No.: 09/569,993

(22) Filed: May 12, 2000

(51) Int. Cl.$^7$ .................................................. B62B 11/00

(52) U.S. Cl. ......................................... 280/47.34

(58) Field of Search ..................... 280/47.34, 47.35, 280/79.11, 651, 79.3, 33.998, 47.36, 79.2; 62/371, 372; 312/299, 304; 248/346.03; D34/19, 20, 21, 22, 25; 49/208, 413, 209, 155, 152, 449; 220/592.2, 1.5; 70/2, 96, 97, 281, 282, 283, 284, DIG. 46

(56) References Cited

U.S. PATENT DOCUMENTS

| | | | |
|---|---|---|---|
| 202,267 A | * | 4/1878 | Keeler .................. 292/DIG. 46 |
| 1,331,131 A | * | 2/1920 | Urban .................. 292/DIG. 46 |
| 1,455,395 A | * | 5/1923 | Exum ..................... 280/47.34 |
| 1,738,183 A | * | 12/1929 | Hickman .................... 49/152 |
| D134,577 S | * | 12/1942 | Barnes ........................ D34/21 |
| 2,339,420 A | * | 1/1944 | Merz .......................... 49/208 |
| D153,553 S | * | 4/1949 | Raber ......................... D34/21 |
| 2,698,196 A | * | 12/1954 | Mangus ..................... 292/283 |
| 2,793,406 A | * | 5/1957 | Focht ......................... 49/413 |
| 3,249,074 A | * | 5/1966 | Deaton |
| 3,460,861 A | * | 8/1969 | Niiola ....................... 292/283 |
| 3,628,807 A | * | 12/1971 | Fullington et al. ......... 280/79.3 |
| 3,736,035 A | * | 5/1973 | Brown et al. ............ 49/413 X |
| 3,778,099 A | * | 12/1973 | Rogove et al. |
| D230,257 S | * | 2/1974 | Corini ........................ D34/19 |
| 3,797,842 A | * | 3/1974 | Swick, Jr. et al. ......... 280/79.3 |
| 3,823,972 A | * | 7/1974 | Ramer ..................... 294/68.26 |
| 3,877,744 A | | 4/1975 | Miller |
| 3,906,744 A | * | 9/1975 | Knapp et al. |
| 4,138,504 A | * | 2/1979 | Mack et al. |
| 4,446,705 A | * | 5/1984 | Loucks ........................ 62/372 |
| 4,576,779 A | * | 3/1986 | McWilliams |
| 4,706,823 A | * | 11/1987 | Visser .................... 211/133.1 |
| 4,764,333 A | * | 8/1988 | Minshall et al. |
| 4,805,859 A | * | 2/1989 | Hudson ................. 248/346.03 |
| D305,822 S | | 1/1990 | Kolvites et al. |
| 5,056,625 A | * | 10/1991 | Miskin et al. |
| 5,076,650 A | * | 12/1991 | Klein et al. ............... 312/249.8 |
| D322,915 S | * | 1/1992 | Franklin ..................... D7/606 |
| D323,051 S | | 1/1992 | Baggott |
| 5,123,665 A | * | 6/1992 | Levy |
| 5,390,834 A | | 2/1995 | Bitter et al. |
| 5,397,010 A | * | 3/1995 | Gibot ........................ 220/1.5 |
| D362,101 S | * | 9/1995 | Maddux et al. |
| 5,462,299 A | * | 10/1995 | Maddux .................. 280/47.35 |
| 5,480,170 A | * | 1/1996 | Kaiser, II ............. 280/47.34 X |
| 5,605,344 A | * | 2/1997 | Insalco et al. ........... 280/47.34 |
| D382,064 S | * | 8/1997 | McPhail .................... D25/15 |
| 5,704,624 A | * | 1/1998 | Davis .................... 280/47.34 |
| D395,112 S | * | 6/1998 | Puhl ......................... D34/25 |
| 5,921,423 A | | 7/1999 | Howell et al. |
| 6,050,114 A | * | 4/2000 | Park ............................ 70/2 |
| 6,295,829 B1 | * | 10/2001 | Gibot ......................... 62/371 |

FOREIGN PATENT DOCUMENTS

| | | | |
|---|---|---|---|
| DE | 3633945 | * | 4/1988 |
| JP | 5112237 | * | 5/1993 |

* cited by examiner

Primary Examiner—Brian L. Johnson
Assistant Examiner—Bryan Fischmann
(74) Attorney, Agent, or Firm—Brian Beverly

(57) ABSTRACT

An improved meal delivery system and a method for delivery of pre-cooked, chilled meals from a central distribution station to a plurality of remote locations in cooperation with an Automatic Guided Vehicle system, and in particular a one-piece, molded, insulated meal-delivery cart for transportation of chilled meals.

27 Claims, 6 Drawing Sheets

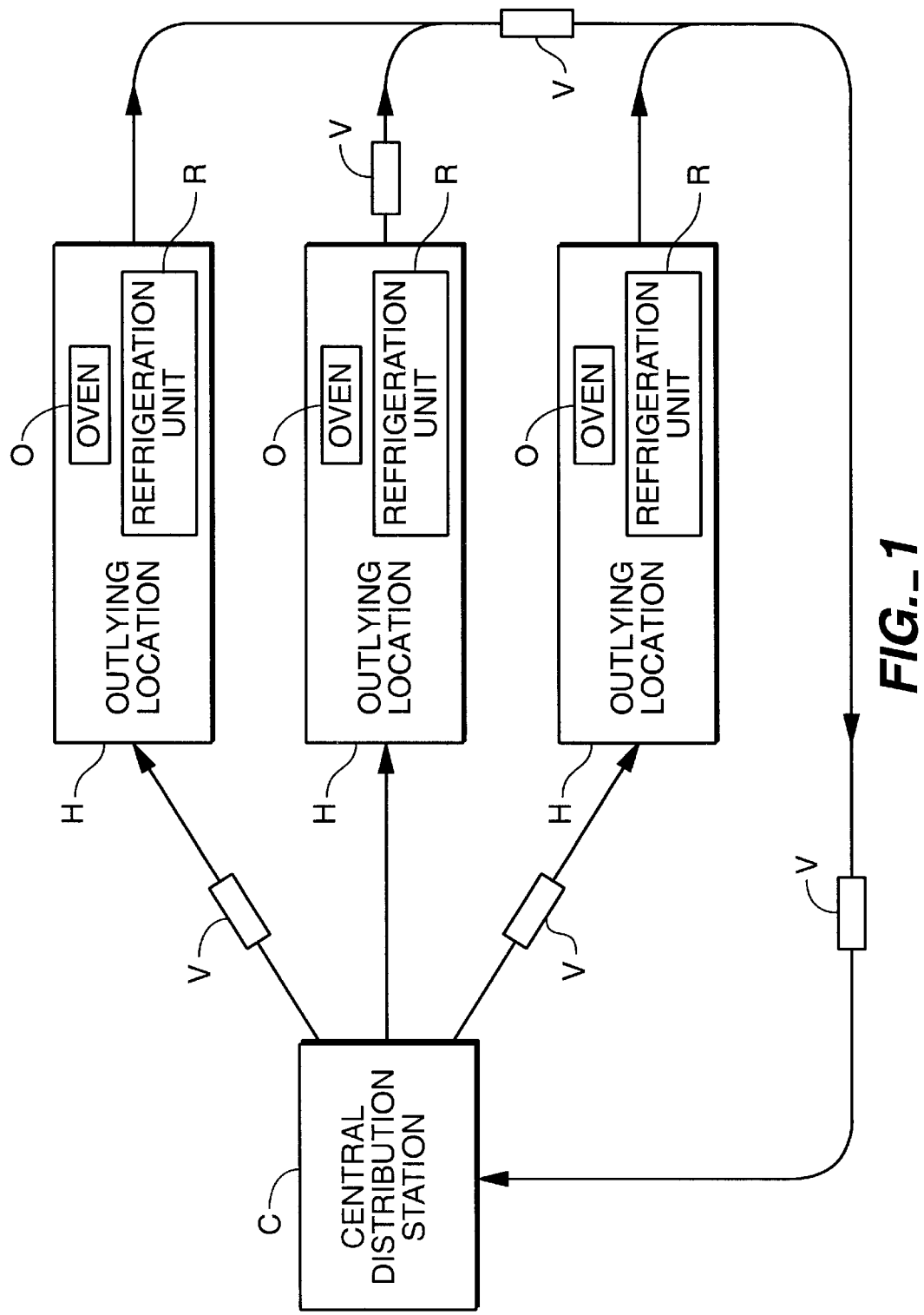

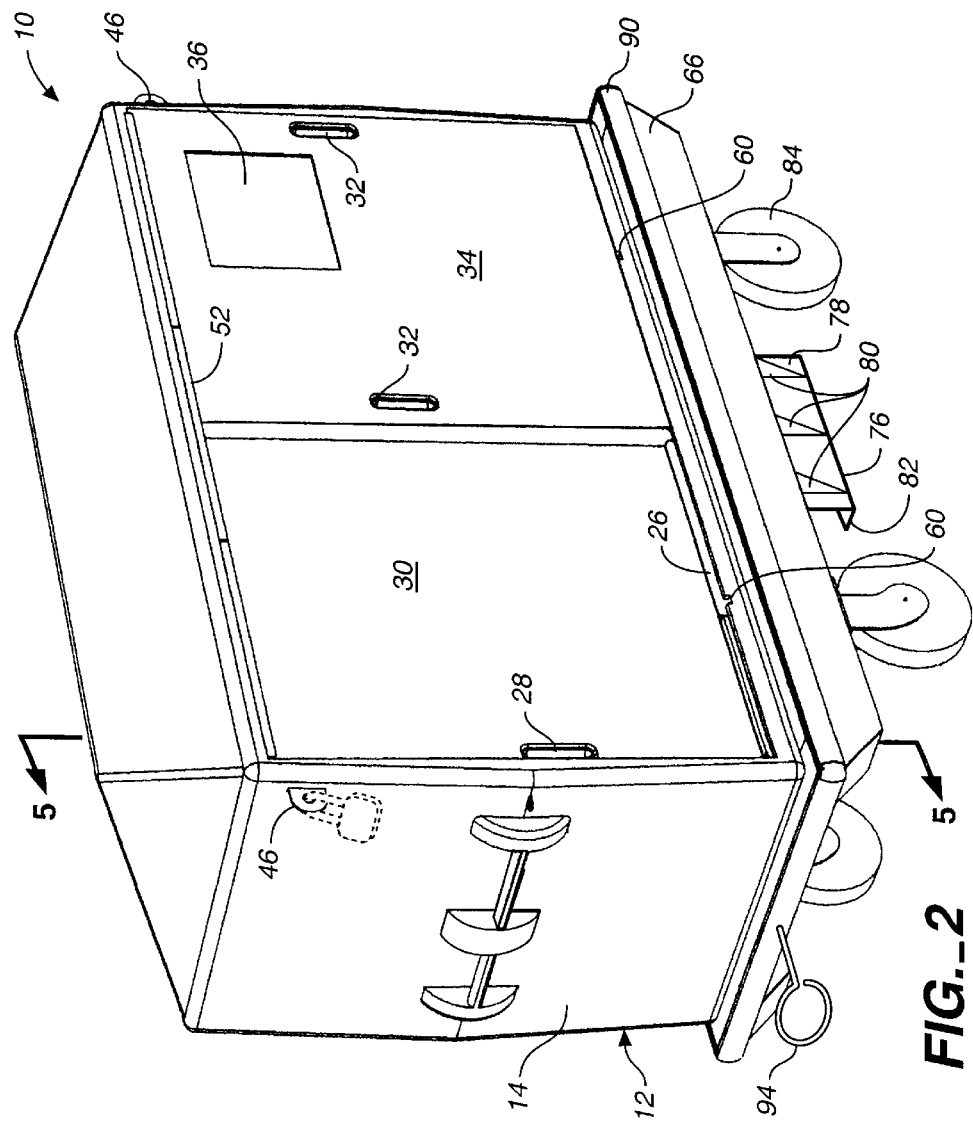
FIG._2

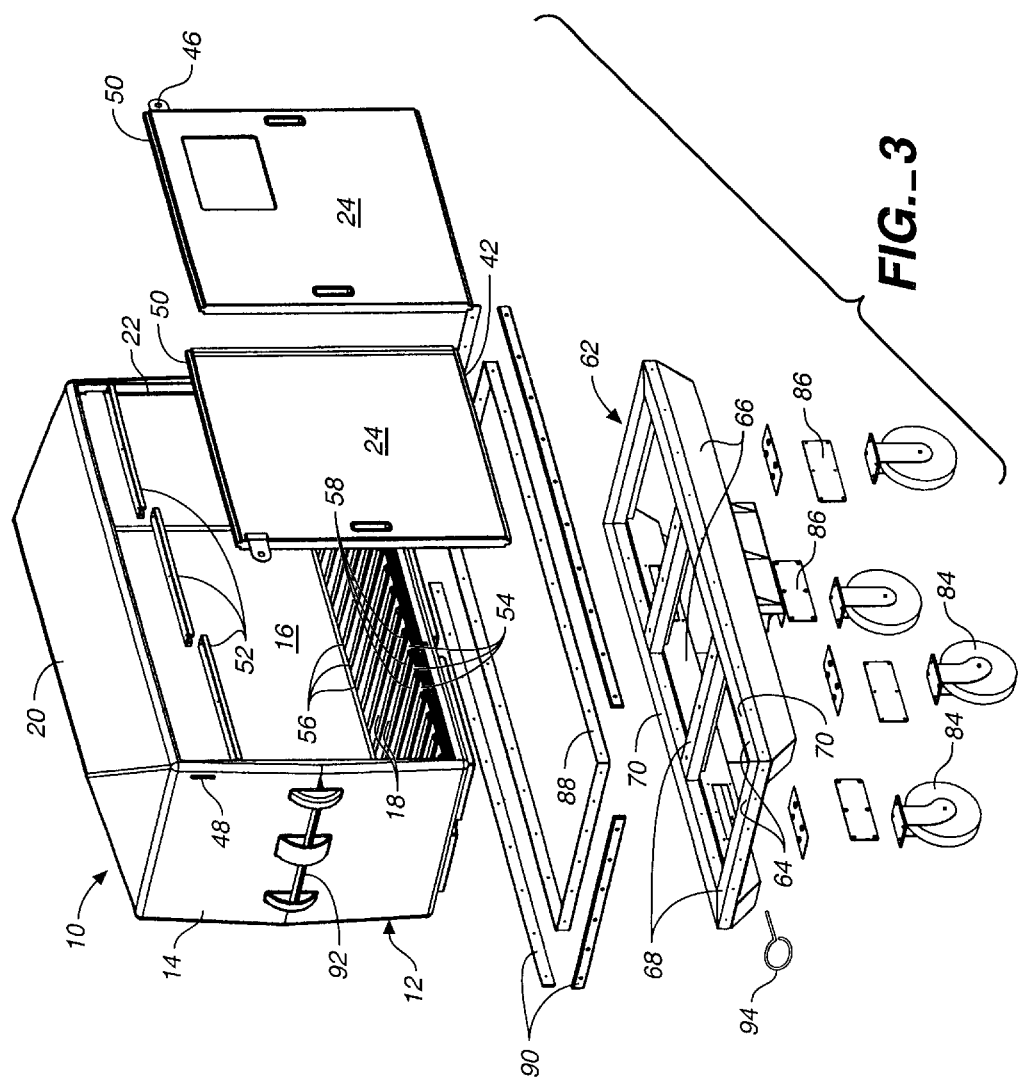

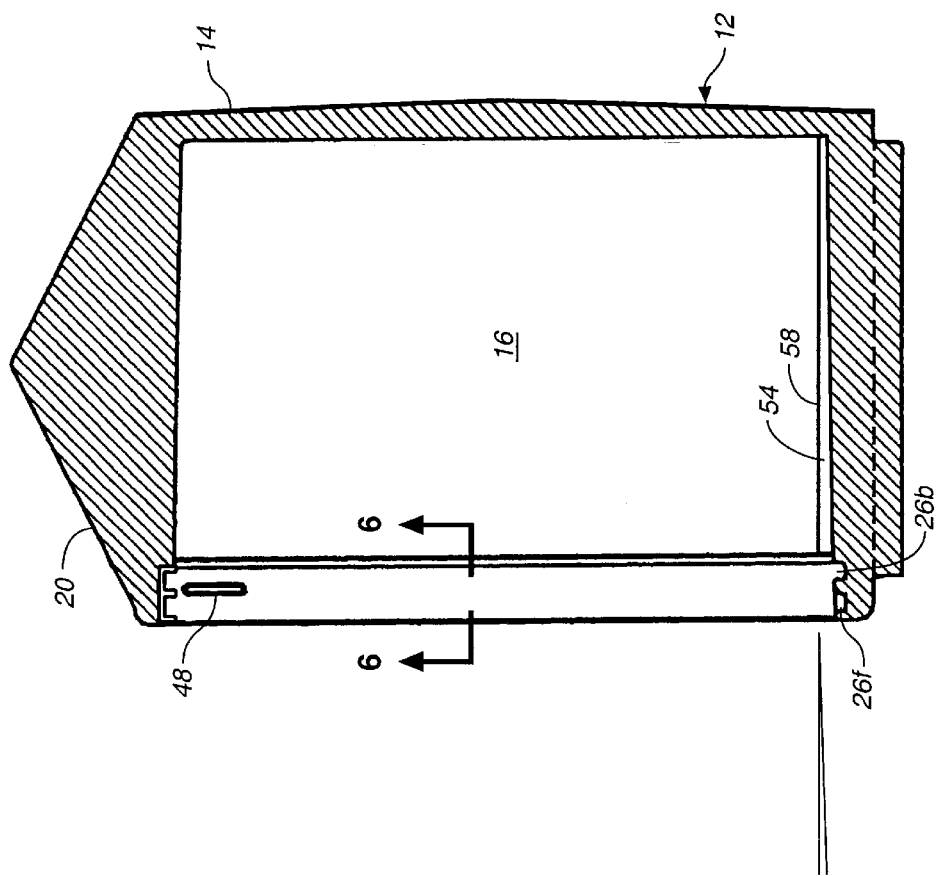
FIG._5
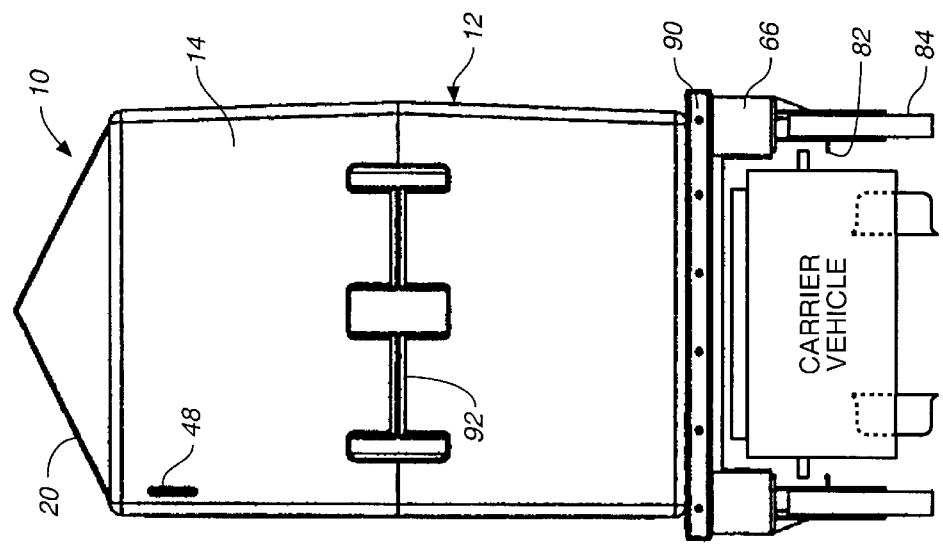
FIG._4

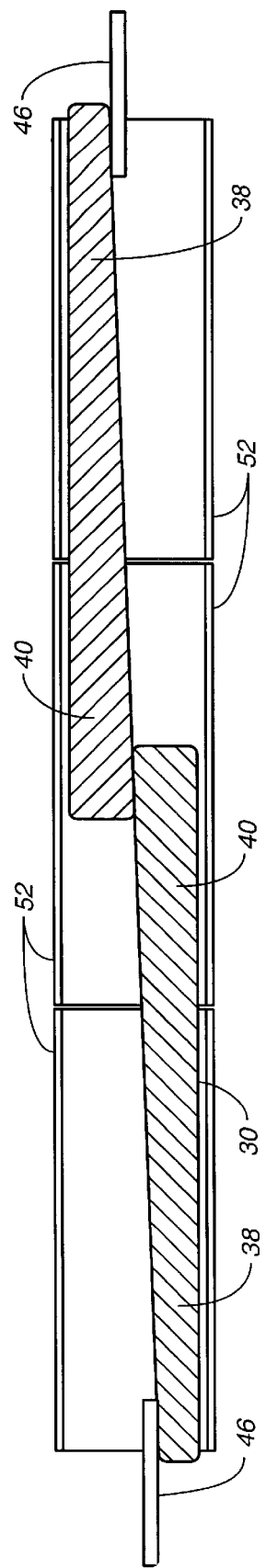
FIG._6A
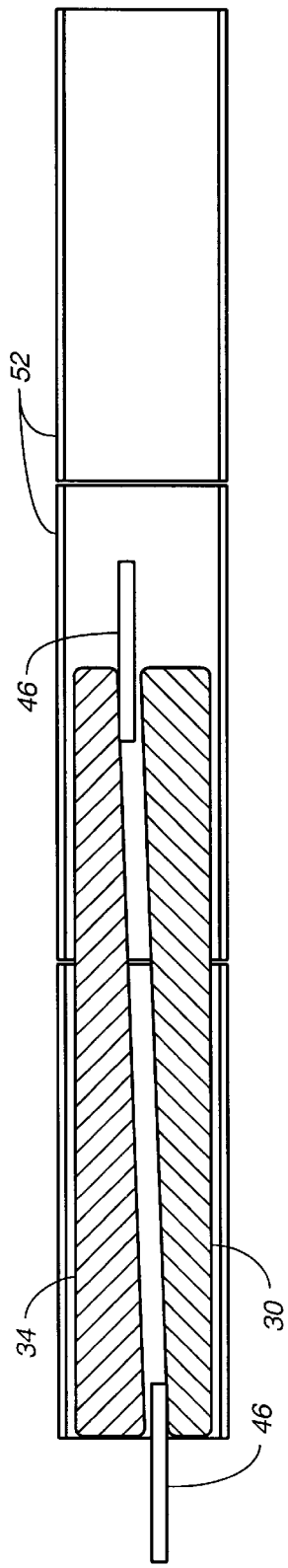
FIG._6B

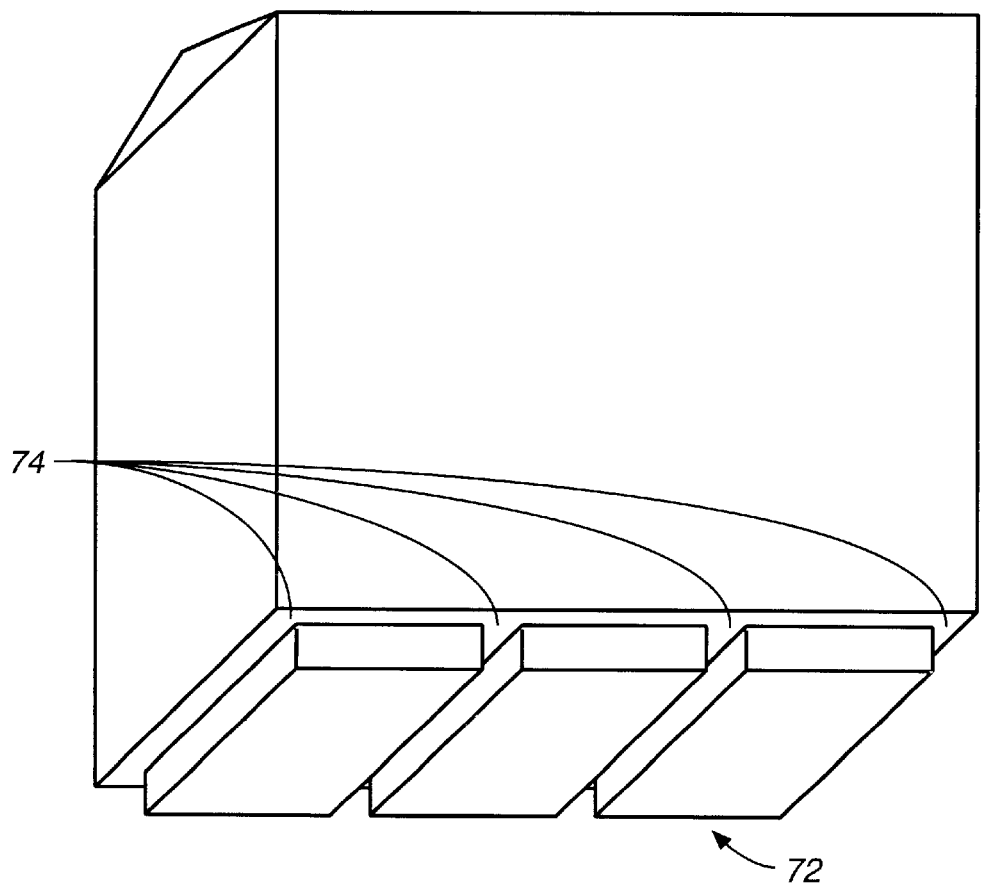
FIG._7

MEAL DELIVERY CART

BACKGROUND

1. Field of the Invention

This invention relates to an improved meal delivery system and to a method for delivery of pre-cooked, chilled meals from a central distribution station to a plurality of remote locations, and in particular to a one-piece, molded, insulated meal delivery cart for transportation of chilled meals in cooperation with an Automatic Guided Vehicle (henceforth "AGV") system.

2. Prior Art

Our population continues to increase and age at a rapid rate. Many people are now confined in, cared for, or work in large institutions and government-sponsored operations, such as prison facilities, mental health facilities, hospitals, and military bases. One notable demographic trend is a marked increase in the number and size of prison facilities in the last twenty years. The greatly increased physical size of prison facilities and the unprecedented increase in the number of inmates housed in them has created many new challenges, including how to provide a large number of persons with proper daily meals reliably. Moreover, in a prison setting, providing the inmate population with decent meals on a regular and reliable schedule reduces tension and generally eases management pressures.

Many prison designs incorporate multiple housing units which may be geographically separated from each other by substantial distances. In these facilities, the difficulty of providing meals for the inhabitants is exacerbated. One approach for meal provision in multiple-unit facilities has been to equip each separate housing unit with its own kitchen. Meals are prepared in each unit's kitchen for the inmates in that unit. Such a one-kitchen-for-each-unit configuration presents unique logistical problems, requires staffing redundancies, and is very expensive to maintain. Indeed, new construction of facilities incorporating a kitchen in each separate housing unit can be prohibitively expensive. Expense notwithstanding, it is an undesirable inefficiency.

Another approach has been to provide a central kitchen for preparation of meals which are then delivered to each separated housing unit. Health standards require meals to be fresh, hot portions to be hot, and cold portions to be cold, when served. Any delays between cooking and service allow the hot portions of prepared meals to cool, the cool portions to warm, and the entire meal to become stale, posing a potentially serious health risk.

Substantial savings have been realized by use of an AGV system for automated delivery of meals from a central kitchen by carrying carts stocked with meals on preestablished paths to separate housing units. An AGV system establishes predetermined paths by used of an embedded guidance system, such as a wire. Battery operated carrier vehicles ride on surface tracks above the guidance wire. Each carrier vehicle is programmed to move along a path from a docking station at a central distribution point, e.g., adjacent the central kitchen, to a loading dock adjacent each housing unit. Each carrier vehicle includes a flat top movable between a lowered rest position and a raised carrying position. Each delivery cart has a bottom surface slightly higher than the height of the lowered position of the carrier vehicle, but lower than the raised position. Communication between an operator and each carrier vehicle is accomplished using infrared signals. Accordingly, in normal operation a system programmer communicates a path to a particular housing unit to the carrier vehicle. A meal delivery cart filled with meals for the selected housing unit is moved into position at the central docking station. The carrier vehicle then rolls into position at the docking station underneath the delivery cart. Raising the top of the carrier vehicle lifts the delivery cart. The carrier vehicle then carries the delivery cart along the designated path to the selected housing unit. In this manner delivery of thousands of meals to separate housing units may be achieved with a substantial savings in labor costs previously required to hand deliver prepared meals.

In the prior art, meals prepared in a central kitchen are separated into their hot and cold portions and transferred to meal delivery carts for disbursement to housing units. Prior art meal delivery carts suffer numerous disadvantages, including being very heavy, each weighing as much as 3,500 pounds empty. They are difficult to maneuver and experience frequent, expensive breakdowns. Each cart has separate electrically-powered heating and refrigeration compartments. Cleaning the carts with water damages the heating elements and the compressor. The electrical heating and refrigeration components require constant maintenance, consequently removing carts from active service. Numerous moving parts create a litany of maintenance issues. For example, outwardly swinging doors require frequent repair. Accumulated mechanical problems associated with prior art carts have been known to take as much as thirty percent of the carts out of service at any time.

Maintenance issues aside, in normal use of prior art meal delivery carts, once meals are cooked and prepared in the central kitchen, hot portions are placed in the heated compartment and cold and cool portions placed in the refrigeration compartment of each cart for transportation to the housing units. Once at each housing unit, the cart must be brought inside and plugged into an electrical outlet to power the heating and refrigeration units. Delays from the time the carts are initially loaded with meals to the time the cart is plugged into the electrical outlet result in hot portions cooling and cold portions warming. Prior art food delivery carts are poorly insulated, allowing meals to warm or overheat quickly on hot days. Prior art food delivery carts also incorporate metal surfaces which quickly pick up solar energy and ambient heat. Meals left for too long in the heated compartments dry out. Meals left for too long in either compartment deteriorate and become stale.

An additional complicating factor is that any vehicle used for delivering food or other products is subject to tampering, abuse, and simple neglect. Particularly in a penal institution, tampering is of real concern because the path of the cart may take it through various areas in which it is unattended. Flat tops on the existing carts allow contraband to be anonymously carried from one point to another during transportation.

Each prior art food delivery cart has a capacity to hold only 48 complete meals. Accordingly, delivery of 100 meals requires three cart trips to the housing unit; delivery of 300 meals requires seven trips.

Finally, the cost of manufacturing new and replacement food delivery carts must be acceptable within the budget guidelines of the governmental agency or other supervising authority having responsibility for management of the institution. Purchasing new carts is expensive, costing approximately $18,000 for each new cart.

One successful technique for delivering fresh, hot meals from a central kitchen to outlying facilities is the "cook-chill" method. Under the cook-chill method, hot portions and "cold" portions are prepared in large quantities in a central kitchen and immediately chilled, but not frozen, for storage in the kitchen refrigeration units. Such chilled meal portions can be safely and successfully stored at temperatures between approximately 35° F. and 40° F. for periods of time varying from one week to over a month depending on the particular food. As needed, individual food portions can be removed from storage to assemble complete meals for delivery to remote housing units. Unfortunately, prior art food delivery carts do not readily lend themselves to delivery of cook-chilled meals. A further problem is the lack of heating and refrigeration facilities in each housing unit.

Accordingly, a need exists in an institutional setting, particularly in penal facilities, for a food delivery system for transportation of meals from a central kitchen to outlying housing units, in cooperation with an AGV system that can deliver meals which are fresh and hot, has increased capacity, is tamper-resistant, and is less expensive to acquire and maintain.

SUMMARY OF THE INVENTION

Applicant's invention relates to an improved meal delivery system for delivery of meals from a central distribution point to a plurality of remote housing units in cooperation with an AGV system. Accordingly, applicant's invention provides a plurality of improved meal delivery carts for transportation of cook-chilled meals, and a refrigeration unit and an oven in each housing unit for refrigerated storage or heating of the cook-chilled meals.

In accordance with the invention, a plurality of meal delivery carts are provided, each comprising an insulated enclosure mounted on a wheeled chassis. Two insulated doors close off an interior storage space which is sufficient to accommodate up to two hundred and eight cook-chilled complete meals. Each enclosure and each door is insulated with foam insulation during the manufacturing process using a rotating mold technology to inject insulation between the walls of the enclosure and the door. The enclosure and both doors are sufficiently insulated to maintain a full complement of cook-chilled meals, pre-chilled to approximately 35° F., which have been placed in the interior storage space, with doors closed, at a temperature of no greater than 40° F. for one hour in 100° F. ambient conditions in direct sunlight. Thus, chilled meals can be safely transported in the cart from a central kitchen facility to a remote location all the while maintaining the meals at an acceptable temperature.

Each enclosure is a single molded unit. Similarly, each door is a single molded unit and, because each door is manufactured from the same mold, each door is identical to the other. Accordingly, the enclosure and doors require only two molds—one enclosure mold and one door mold—which facilitates the manufacturing process and makes replacements for broken or defective enclosures or doors readily available. The enclosure and doors are manufactured using high-impact polyethylene making them durable, impervious to water, and less amenable to absorption of solar radiation. The enclosure and chassis together weigh approximately 1,500 pounds empty, 3,500 full, making them considerably more maneuverable.

The enclosure doors are disposed in top and bottom raceways for sliding from side-to-side. Manufacturing the enclosure and doors from one mold each results in reduced overall production costs, especially over the long term once the molds have been purchased, and greatly facilitates repairs by speeding and simplifying production of new enclosures or doors as they may be needed. Each door has a leading edge and a following edge which is thicker than the leading edge. When the doors are in their closed positions, the following edges overlap in sliding abutment, sealing the interior storage space.

The floor of the enclosure is provided with drainage troughs to allow the interior of the enclosure to be hosed out, minimizing the time and effort needed for cleaning.

The wheeled chassis provides a channel through which a carrier vehicle of an AGV system can drive. The enclosure includes a flat bottom surface for riding on the top flat surface of a carrier vehicle. Accordingly, a meal delivery cart according to the invention may be placed in a docking station where a carrier vehicle may then be brought into position directly thereunder for picking up the cart.

The overall construction and design of the cart provides essentially no horizontal surfaces which could be used for unwanted transportation of contraband. The single mold construction of the enclosure and doors provide smooth continuous surfaces lacking breaks or openings where objects can be inserted for illicit traffic. The roof of the enclosure is slanted at a steepness which does not allow objects to be placed on it. The base of the enclosure mates with the chassis to present a smooth surface underneath the enclosure. Each door is provided with a lock preventing the doors from being removed from the enclosure. The cart is also equipped with anti-tipping brackets to prevent it from being pushed over. The features of the cart thus greatly discourage tampering.

At each remote housing unit meals or meal portions may be stored in a refrigeration unit. When needed, hot portions are removed from the refrigeration unit and heated in warming facilities. When the hot portions are ready, they are assembled with the cold portions for immediate service as a complete meal.

It is therefore a primary object of the invention to provide an improved meal delivery system for transportation of cook-chilled meals from a central kitchen facility to outlying or remote locations while at all times during transportation maintaining the meals chilled at a safe temperature.

It is another object of the invention to provide an improved meal delivery cart for transportation of cook-chilled meals from a central kitchen facility to outlying or remote locations while at all times during transportation maintaining the meals chilled at a safe temperature.

It is a further object of the invention to provide an improved meal delivery system for transportation of cook-chilled meals from a central kitchen facility to outlying housing units while at all times during transportation maintaining the meals chilled at a safe temperature.

It is yet another object of the invention to provide an improved meal delivery cart which comprises a one-piece enclosure having single-unit molded identical, reversible doors defining an interior storage space which is durable, impervious to water, and light weight in comparison to prior art meal delivery carts.

It is a further object of the invention to provide a tamper-proof meal delivery cart which is insulated to allow cook-chilled meals to be transported from a central distribution area to outlying housing units for reheating and service.

It is a still further object of the invention to provide an improved meal delivery system for transportation of cook-chilled meals, at all times during transportation maintaining the meals chilled at a safe temperature, from a central kitchen facility to outlying or remote locations each having a refrigeration unit for chilled storage of the meals, and a oven for reheating of the meals for service.

It is another object of the invention to provide a meal delivery cart which is easy and relatively inexpensive to manufacture and wherein the manufacturing process allows quick and easy replacement of broken or defective parts.

It is another object of the invention to provide a meal delivery cart capable of transporting up to 208 individual pre-cooked meals, chilled to approximately thirty-five degrees Fahrenheit, having a storage space sufficiently insulated to maintain the temperature of such chilled meals at no greater than forty degrees Fahrenheit for one hour in one hundred degree Fahrenheit ambient conditions in direct sunlight.

It is a still further object of the invention to provide a meal delivery cart having smooth exterior surfaces and having easy to clean interior and exterior surfaces.

BRIEF DESCRIPTION OF THE ILLUSTRATIONS

FIG. 1 is a schematic illustration of an improved meal delivery system according to the invention.

FIG. 2 is a perspective view of a meal delivery cart according to the invention.

FIG. 3 is an exploded view of the meal delivery cart depicted in FIG. 2.

FIG. 4 is an end view of the meal delivery cart depicted in FIG. 2.

FIG. 5 is a sectional view of the enclosure of the meal delivery cart depicted in FIG. 2, taken along lines 5—5.

FIG. 6A is a sectional view of the doors to the meal delivery cart of FIG. 5, taken along lines 6—6, showing the doors in closed position.

FIG. 6B is a sectional view of the doors to the meal delivery cart of FIG. 5, taken along lines 6—6, showing one door in open position and the other in closed position.

FIG. 7 is a perspective view of the meal delivery cart of FIG. 2 showing the bottom surface of the cart.

DETAILED DESCRIPTION OF THE ILLUSTRATED EMBODIMENT

In accordance with the invention, an improved meal delivery system is generally shown in FIG. 1. A plurality of improved meal delivery carts V is disbursed from a central distribution station C to a plurality of outlying locations H. Each outlying location is provided with at least one oven O and at least one refrigeration unit R.

An improved meal-delivery cart 10 is depicted fully assembled in FIG. 2. Referring to FIG. 3, the cart 10 includes an enclosure 12 having two side walls 14, a back wall 16, a floor 18, and a roof 20. The enclosure 12 is a single molded unit preferably constructed of high-density polyethylene, capable of withstanding numerous forceful side impacts, also impervious to water and resistant to absorption of solar radiation. The enclosure 12 is a molded construction consisting of an outer wall and an inner wall, defining therebetween an interior space. Insulation (not shown) is injected into the interior space during the manufacturing process. In the preferred embodiment, the interior spaces of the enclosure are filled with foam insulation, using a patented rotating mold technology.

The roof 20 of the enclosure 12 has a hipped design presenting four sloped surfaces. This configuration allows water to run off the roof 20 and also prevents articles from being placed and retained on the enclosure 12 when the cart is in motion, thus effectively frustrating any illicit "hitch-hiking" of contraband from one location to another. Preferably, the slope is set at an angle of 30° from horizontal.

Referring again to FIG. 3, the side walls 14, floor 18, and roof 20 frame an opening 22 fitted with two overlapping, sliding doors 24. The bottom of each door rests in a raceway 26 (FIG. 2) located in the bottom of the opening 22 allowing each door to slide from side-to-side the entire width of the opening. Each door is a single molded unit and, as with the enclosure, also manufactured using high-impact polyethylene for durability, ready replaceability, and imperviousness to water. Considerable manufacturing efficiency is realized by manufacturing both doors from a single mold. In actual operation, the two doors needed to cover the opening 22 are two copies of the same door, with one door disposed in reverse position relative to the other. Each door 24 has a handle indentation 28 on a first side 30 and two similar indentations 32 on a second side 34. The second side also includes a "white board" 36 where information specific to the contents of the enclosure can be written. As can best be seen in FIGS. 6A and 6B, each door 24 has a leading side 38 and a following side 40, the following side 40 being thicker than the leading side 38. In an alternative embodiment, each door 24 has a pronounced raised edge on one side of the door 24. Referring to FIGS. 3, 5, 6A and 6B, assembly of the doors 24 to the enclosure 12 is accomplished by placing the doors in dual raceways in the opening. The bottom rail 42 resting in back raceway 26b at the bottom of the opening 22. The second door is then placed in the opening with the bottom rail 42 or the first door positioned in a forward raceway 26f. When the doors 24 are each moved into their closed position, as shown in FIG. 6A, the following slide 40 of each door overlaps and comes into sliding contract with each other, creating a seal. Each door 24 has a laterally projecting hasp 46 which, when the door 24 is in a closed position, projects through a slot 48 in the side wall 14 of the cart 10. Each door can therefore be locked by placing a lock on the hasp 46 preventing it from being pulled back through the slot 48. The top rails 50 of each door are held in place by three door tracks 52 fixed in place using threaded fasteners. On each side of the enclosure below the hasp is a catch having a hole appropriately sized to receive a lock used to lock the doors in place when they are in their closed position. The catches provide convenient place to store the locks when the doors are open and prevent them from being lost or pilfered.

The floor 18 of the enclosure 12 is provided with a series of troughs 54, each of which is sloped downwardly toward the opening 22 to the interior of the enclosure 12. Spaced between the troughs 54 are a series of horizontal strips 56, each having a horizontal surface 58. Taken collectively, the horizontal surfaces 58 form a horizontal floor. The enclosure 12 can be easily and thoroughly cleaned by simple hosing out the interior. Water will drain into the troughs 54 and flow toward forward, middle, and rear shoulders 61 or opening 22. A polarity of short transverse groves 60 cuts across the raceways 26b and 26f in the bottom of the opening 22, providing an outlet for water to drain out the enclosure 12.

The enclosure 12 and door 24 assembly is supported by a pontoon-type base 62 comprising a pontoon top 64 and two depending pontoon 66. The pontoon top 64 includes four cross members 68 and two side members 70 joined to form the framework of the pontoon-type base 62. The bottom surface 72 of the enclosure includes recesses 74 which mesh with the cross and side member 68, 70 or the base. The height of the cross and side members 68, 70 measures the same as the depth of the recesses 74, such that when the enclosure is placed on the base 62, a substantially continuous smooth undersurface is presented consisting of the bottom surface 72 of the enclosure 12 and the cross and side members of the base 62. The smooth surface acts as another safety measure in that it provides very limited opportunities for placement of contraband on the underside of the enclosure 12. Essentially, with the enclosure mounted on the base, the assembled apparatus has no hidden horizontal surfaces where objects can be placed out of view. The pontoon base 62 extends laterally outward beyond the outer perimeter of the enclosure 12 providing the enclosure with a bumper. The pontoon base 62 extends laterally outward beyond the outer perimeter of the enclosure 12 providing the enclosure with a bumper.

On the underside of the base 62 depending from the pontoons 66 are two anti-tip brackets 76. Each bracket 76 comprises a vertical plate 78 depending from one of the pontoons 66. Preferably, the plate 78 is backed by a plurality of reinforcing ribs 80 to maintain the vertical plate 78 in place against lateral pressure. A horizontal plate 82 is attached to the lower edge of the plate 78 and extends inwardly such that the anti-tip brackets are in facing orientation. In typical operation, the fully assembled cart 10 is positioned in a predetermined path of an AGV. The AGV drives beneath the cart 10 under the pontoon-type base, and two opposing, outwardly extending anti-tip arms on the sides of the AGV slide over the inwardly extending anti-tip brackets 76. Once the AGV lifts the cart 10, the anti-tip brackets 76 prevent the cart 10 from tipping over or being pushed over during transition.

Referring again to FIG. 3, the pontoon base 62 is supported on four wheels 84. In the preferred embodiment, all four wheels 84 are swivel casters for enhanced maneuverability. In other embodiments, only two of the wheels 84 are swivel casters. In still other embodiments, regular wheels only are used. Each wheel 84 is attached to the underside of a pontoon 66 with threaded fasteners, spot welds or other fastening methods well known in the art. Pontoon access plates 86 are attached to the inside surfaces of the pontoons 66 with threaded fasteners, spot welds or fastening methods well known in the art for access to the interior of the pontoons 66 if needed. Bumper brackets 88 and bumpers 90 are fastened to the perimeter of the pontoon top 64 for cushioning of the cart 10 against impacts.

Each side wall 14 of the enclosure 12 is provided with a sturdy handle 92 to facilitate pulling and pushing of the cart 10. The handles are specially constructed to project from the surface of the cart, rather than being molded recesses where objects can be hidden. Each handle has a bar and three spaced braces projecting from the exterior surface of the cart. Each brace has an outwardly facing convex surface too steep upon which to place any objects, and opposing vertical side faces. The bar extends between opposing pairs of vertical side faces of the spaced-apart braces. The entire handle is a unitary molded portion of the cart. Each base 62 is equipped with at least one threaded eyelet 94 to enable the cart 10 to be towed. Preferably one eyelet is located on each side of the base 62.

Fully assembled, an improved meal delivery cart comprises relatively few moving parts, primarily due to the simplicity of construction of the enclosure and doors, greatly reducing the maintenance needs of a fleet of such carts.

In normal operation, as shown in FIG. 1, central distribution station C is provided, usually adjacent a central kitchen facility. Each cart is filled with meals using a plurality of stackable meal trays, each meal tray capable of holding eighteen complete cook-chilled meals. The central distribution station C includes slight wheel indentations in the floor for each of the wheels 84 of the cart, such that a cart filled with meals may be accurately positioned over the path of the carrier vehicle by placing each of the four wheels 84 in the wheel indentations. A carrier vehicle of an AGV system which has been preprogrammed by a system operator to travel along a selected path, moves into position underneath the cart 10 and stops. The carrier vehicle then lifts up the cart 10 by raising the carrier's flat top surface. The carrier vehicle then moves away from the docking station, carrying the cart 10 along the selected path to a designated outlying location H.

At location H, the carrier vehicle stops and lowers its top thereby setting the cart's chassis on the surface whence it may be maneuvered by hand away from the carrier vehicle. Meals loaded into the cart are unloaded and moved by hand to a refrigeration unit R for chilled storage. Or, hot portions of the meals may be placed directly into a oven O for reheating. Reheated hot portions are assembled with cold portions to make a complete meal for service. In this manner delivery of thousands of cook-chilled meals to separate housing units may be achieved with a substantial savings in labor costs previously required to hand deliver prepared meals. Since meals are chilled at all times, including during transportation, deliveries to many separate housing units can be staggered so that meals are made available simultaneously for breakfast, lunch and dinner in many locations.

While the system described above is primarily used for delivery of meals, it can also be used to deliver and return other items, including laundry, concession items, and trash.

Finally, although the molds for the enclosure and doors are costly, they represent a one-time expense. After the molds are acquired, each new meal cart can be purchased for approximately $3,000.

There have thus been described and illustrated certain preferred embodiments of an improved meal delivery system according to the invention. While preferred embodiments have been described and disclosed, it will be recognized by those with skill in the art that modifications are within the true spirit and scope of the invention. The appended claims are intended to cover all such modifications.

What is claimed is:

1. A meal delivery cart comprising:
   a one-piece molded enclosure defining an interior storage space, said enclosure having one open side for access to said interior storage space, and
   two overlapping doors slidably disposed in said open side, each said door a single molded unit identical to the other door, each said door moveable between an open position and a closed position, such that when both doors are in the closed position, they close off the interior storage space of said enclosure, and each said door including a following side, a leading side, and an inclined surface forming a continuous slope between said following side and said leading side, said following side of each of said doors having a thickness greater than said leading side, said following sides of said inclined surfaces in sliding abutment when said doors are each in said closed position, thereby forming a seal.

2. The meal delivery cart as recited in claim 1 wherein:
   when said enclosure is closed, said enclosure and said doors are at least sufficiently insulated to maintain meals which have been pre-chilled to approximately 35° F. and placed in said interior storage space, at a temperature of no more than 40° F. for one hour in 100° F. ambient conditions in direct sunlight.

3. A meal delivery cart comprising:

a one-piece molded enclosure defining an interior storage space, said enclosure having one open side for access to said interior storage space, and said interior storage space of said enclosure having a floor, said floor having a plurality of troughs disposed approximately perpendicular to and sloping downwardly towards said open side of said enclosure, and two overlapping doors slidably disposed in said open side, each said door moveable between an open position and a closed position, such that when both doors are in the closed position, they close off the interior storage space of said enclosure.

4. The meal delivery cart as recited in claim 3 wherein:

said floor includes a plurality of spaced apart strips, said troughs interspersed there between, each said strip having a horizontal top surface, said top surfaces of said strips collectively forming a horizontal surface for placing articles in the enclosure.

5. The meal delivery cart of claim 3, wherein:

said open side comprises a dual raceway having a forward raceway and a back raceway, said dual raceway having a plurality of shoulders, each of said doors having a downward reaching tongue for sliding disposition in one of said raceways in a tongue-and-groove configuration, said shoulders having a plurality of transverse grooves for draining liquids from said troughs, said transverse grooves blocked and said interior storage space sealed off by said doors when in said closed position.

6. A meal delivery cart comprising:

a one-piece molded enclosure defining an interior storage space, said enclosure having one open side for access to said interior storage space, said enclosure further having an integral top portion having a uniform slope at least steep enough to prevent articles placed anywhere on said top portion from being retained thereon, and two overlapping doors slidably disposed in said open side, each said door moveable between an open position and a closed position, such that when both doors are in the closed position, they close off the interior storage space of said enclosure.

7. The meal delivery cart as recited in claim 6 wherein:

said slope of said cover is approximately 30° to horizontal.

8. The meal delivery cart of claim 6, wherein:

said cover is an integrated portion of said molded enclosure.

9. A meal delivery cart for use in cooperation with a carrier vehicle having a flat top having a raised position for lifting objects placed thereon, the meal delivery cart comprising:

a one-piece molded enclosure defining an interior storage space, said enclosure having one open side for access to said interior storage space, and two overlapping doors slidably disposed in said open side, each said door moveable between an open position and a closed position, such that when both doors are in the closed position, they close off the interior storage space of said enclosure, said enclosure further having a flat bottom surface for lying on the flat top of a carrier vehicle, and said enclosure having a base including a bottom surface and a plurality of recesses, a wheeled chassis, said enclosure mounted on said wheeled chassis, said wheeled chassis having a forward side and a back side, said forward side and said back side each having two corners, each corner having a wheel depending therefrom, said wheels depending from said corners of said front side and said wheels depending from said corners of said back side spaced apart sufficiently to allow a carrier vehicle to pass freely between them for positioning itself underneath said enclosure, and said wheeled chassis further including a plurality of cross-members, each said cross-member having a lower surface, said cross-members of said chassis mating with said recesses of said enclosure base, said lower surface of said cross-members and said bottom surface of said base positioned in a common plane.

10. The meal delivery cart of claim 9, wherein:

said bottom surface of said base and said lower surfaces of said plurality of cross-members forming a substantially continuous flat surface.

11. The meal delivery cart of claim 10, wherein:

when said doors are in said closed position, said wheeled chassis and said enclosure mounted thereon have collectively no hidden horizontal surfaces.

12. A meal delivery cart for use in cooperation with an automatic guided vehicle system, the automatic guided vehicle system comprising a plurality of carrier vehicles, each carrier vehicle having two opposing vertical sides, each side including at least one outwardly extending horizontal anti-tip arm, the meal delivery cart comprising:

a one-piece molded enclosure defining an interior storage space, said enclosure having one open side for access to said interior storage space, two overlapping doors slidably disposed in said open side, each said door moveable between an open position and a closed position, such that when both doors are in the closed position, they close off the interior storage space of said enclosure, and a wheeled chassis, said enclosure mounted on said wheeled chassis, said chassis having two spaced apart anti-tip brackets disposed in facing relation, each bracket having a vertical portion including a lower end, said vertical portion depending from said chassis, each said bracket further having an inwardly extending horizontal plate attached to said lower end of said vertical portion for disposition beneath an outwardly extending anti-tip arm of a carrier vehicle such that tipping of the cart presses one of said horizontal plates upwardly against an above-disposed anti-tip arm, thereby preventing the cart from overturning.

13. The meal delivery cart of claim 12, the carrier vehicles each having a flat top having a lowermost position, the lowermost position having an elevation at least as high as said horizontal plate of said anti-tip brackets, the flat top also having a raised position for lifting objects, the meal delivery cart further comprising:

said wheeled chassis having a forward side and a back side, said forward side and said back side each having two corners, a forward wheel depending from each corner at said forward side, and a back wheel depending from each corner at said back side, said wheels having bottom surfaces for resting on a supporting surface, said enclosure further having a flat bottom surface, said wheeled chassis having no obstructions between said forward wheels and said back wheels and no obstructions between said bottom surfaces of said wheels and a horizontal plane at least as high as said horizontal plates of said anti-tip brackets, defining thereby an obstruction-free area for passage of one of the carrier vehicles between said back wheels to position itself below said enclosure between said forward wheels and said back wheels and providing a clearance between said forward wheels and said back wheels for elevating the flat top of a carrier vehicle so positioned into the raised position for engaging said flat bottom surface and lifting said enclosure.

14. The meal delivery cart as recited in claim 12, wherein: said chassis includes means for towing said cart.

15. The meal delivery cart as recited in claim 14, wherein: said means for towing comprises at least one threaded eyelet.

16. A meal delivery cart comprising:

a one-piece molded enclosure defining an interior storage space, said enclosure having one open side for access to said interior storage space, said interior storage space of said enclosure having a floor, said floor having a plurality of troughs disposed approximately perpendicular to and sloping downwardly towards said open side of said enclosure, said floor further including a plurality of spaced apart strips, said troughs interspersed there between, each said strip having a horizontal top surface, said top surfaces of said strips collectively forming a horizontal surface for placing articles in the enclosure, two overlapping doors slidably disposed in said open side of said enclosure, each said door moveable between an open position and a closed position, such that when both doors are in the closed position, they close off said interior storage spaces, when said enclosure is closed, said enclosure at least sufficiently insulated to maintain meals which have been pre-chilled to approximately 35° F. and placed in said interior storage space, at no more than 40° F. for one hour in 100° F. ambient conditions in direct sunlight, and a wheeled chassis, said enclosure mounted on said wheeled chassis.

17. The meal delivery cart as recited in claim 16, wherein: said enclosure has two opposing side walls, and each said side wall includes a handle for maneuvering said cart.

18. A meal delivery cart for use in cooperation with an automatic guided vehicle system, the automatic guided vehicle system comprising a plurality of carrier vehicles, each carrier vehicle having two opposing vertical sides, each side including at least one outwardly extending horizontal anti-tip arm, each carrier vehicle further having a flat top having a raised position, said meal delivery cart comprising:

a one-piece molded enclosure defining an interior storage space, said enclosure having one open side for access to said interior storage space, said interior storage space of said enclosure having a floor, said floor having a plurality of troughs disposed approximately perpendicular to and sloping downwardly towards said open side of said enclosure, said floor further including a plurality of spaced apart strips, said troughs interspersed there between, each said strip having a horizontal top surface, said top surfaces of said strips collectively forming a horizontal surface for placing articles in the enclosure, two overlapping doors slidably disposed in said open side, each said door being a single molded unit identical to the other door, each said door moveable between an open position and a closed position, such that when both doors are in the closed position, they close off the interior storage space of said enclosure, each said door including a following side and a leading side, said following side of each of said doors having a thickness greater than said leading side, said following sides of said door in sliding abutment when said doors are each in said closed position, thereby forming a seal, when said enclosure is closed, said enclosure is at least sufficiently insulated to maintain meals which have been pre-chilled to approximately 35° F. and placed in said interior storage space, at no more than 40° F. for one hour in 100° F. ambient conditions in direct sunlight, said enclosure including a cover having a slope sufficiently steep to prevent articles placed on top of the cover from being there retained, a wheeled chassis, said enclosure mounted on said wheeled chassis, said enclosure having a flat bottom surface for lying on the flat top of a carrier vehicle when in the raised position, each said chassis having a front side and a rear side, said chassis further having two anti-tip brackets depending respectively from said front side and from said back side of said chassis, said anti-tip brackets disposed in facing relation, each bracket having a vertical portion including a lower end, said vertical portion depending from said chassis, each said bracket further having an inwardly extending horizontal plate attached to said lower end of said vertical portion for disposition beneath an anti-tip arm of a side of a carrier vehicle when said enclosure is positioned above one of the carrier vehicles, such that tipping of the cart presses one of said horizontal plates upwardly against an above-disposed anti-tip arm, thereby preventing the cart from overturning.

19. The meal delivery cart as recited in claim 18, wherein: said enclosure has two opposing side walls, and each said side wall includes a handle for maneuvering said cart, and said chassis includes at least one threaded eyelet for towing said cart.

20. A meal delivery cart comprising:

a one-piece molded enclosure defining an interior storage space, said enclosure having one open side for access to said interior storage space, and two overlapping doors slidably disposed in said open side, each said door moveable between an open position and a closed position, such that when both doors are in the closed position, they close off the interior storage space of said enclosure, and with said doors in said closed position each of said doors and said enclosure having substantially continuous, uninterrupted exterior surfaces, said exterior surfaces having substantially no horizontal surfaces.

21. A meal delivery cart comprising:

a one-piece molded enclosure defining an interior storage space, said enclosure having one open side for access to said interior storage space, two overlapping doors slidably disposed in said open side, each said door moveable between an open position and a closed position, such that when both doors are in the closed position, they close off the interior storage space of said enclosure, and with said doors in said closed position, said enclosure and said doors collectively having an exterior surface, said exterior surface having no openings and no horizontal surfaces, and at least one handle for maneuvering the cart, said handle having at least one bar and at least two spaced braces, each said brace projecting from said exterior surface and having an outwardly facing convex surface and a substantially vertical side face, said convex surface having a upper portion having an acute downward slope, said convex surface intersecting with said exterior surface of said enclosure at said upper portion, each said brace further having no horizontal surfaces, said bar extending between an opposing pair of said vertical side faces of said at least two spaced braces.

22. The meal delivery cart of claim 21, wherein:

said at least one handle comprises two handles on opposite sides of said enclosure.

23. The meal delivery cart of claim 21, wherein:

said at least two spaced braces comprises three spaced braces, and said at least one bar comprises two bars, each of said two bars extending between an opposing pair of said vertical side faces of two of said three spaced braces.

24. The meal delivery cart of claim 21, wherein:

each of said braces is a molded part of said enclosure.

25. A meal delivery cart comprising:

a one-piece molded enclosure defining an interior storage space, said enclosure having two opposing side walls, one open side for access to said interior storage space, and two overlapping doors slidably disposed in said open side, each said door moveable between an open position and a closed position, such that when both doors are in the closed position they close off the interior storage space of said enclosure, each said door having a laterally projecting hasp, each said side wall having a slot for sliding projection there through of said hasp, when each said door is in said closed position said hasp projecting through said slot, said hasps for accepting locks to lock said doors in said closed position.

26. The meal delivery cart of claim 25, wherein:

each said hasp is molded into one of said doors.

27. The meal delivery cart of claim 25, further comprising:

each said side wall having a catch having a hole, said hole at least sized to hold a lock for said hasp when said door is in said open position.

* * * * *